United States Patent [19]

Torres

[11] 4,082,514
[45] Apr. 4, 1978

[54] CATALYTIC CONVERTER FOR TRANSFORMING POLLUTING GASES INTO NON-POLLUTING GASES

[76] Inventor: Silvestre Sanchez Torres, 30 Poniente, No. 1512, Interior 2, Puebla, Pue., Mexico

[21] Appl. No.: 699,755

[22] Filed: Jun. 25, 1976

[30] Foreign Application Priority Data

Jun. 25, 1975 Mexico .................................. 159235

[51] Int. Cl.² .................... B01J 35/04; F01N 3/15
[52] U.S. Cl. ............................. 23/288 F; 23/288 FC; 23/288 FB; 423/213 R; 60/292; 252/477 R; 252/458; 252/446
[58] Field of Search ........ 23/288 F, 288 FC, 288 FB; 423/213.5, 213.2; 60/292; 252/477 R, 458, 446

[56] References Cited

U.S. PATENT DOCUMENTS 2,865,721  12/1958  Lane et al. ...................... 23/288 R
3,259,454  7/1966  Michalko ........................ 423/213.5
3,716,344  2/1973  Ashburn ........................... 23/288 F
3,773,894  11/1973  Bernstein et al. ................ 423/213.5

Primary Examiner—James H. Tayman, Jr.
Attorney, Agent, or Firm—John J. Byrne; Edward E. Dyson

[57] ABSTRACT

This invention relates to a catalytic converter for transforming polluting gases into non-polluting gases comprising a housing having an inlet for the polluting gases and an outlet for the non-polluting gases, a silver coated grill within said housing adjacent to the housing inlet, a mesh, intermediate said silver coated grill and the housing outlet, said mesh comprising an alloy base consisting essentially of from 1.0% to 1.9% silicon, from 10% to 29% chrome, from 1% to 5.1% copper, from 1.1% to 9.1% molybdenum, from 0.11% to 0.5% titanium, from 0.1% to 1.9% carbon and from 0.5% to 0.9% iron and a coating of silver or palladium on said alloy.

5 Claims, 2 Drawing Figures

CATALYTIC CONVERTER FOR TRANSFORMING POLLUTING GASES INTO NON-POLLUTING GASES

BACKGROUND OF THE INVENTION

This invention relates to automotive vehicle mufflers and, more particularly, mufflers having means for catalytically converting polluting gases into non-polluting gases.

This invention is of great importance on the one hand because it will further automotive technology, and, on the other hand, because it will prevent the creation of photochemical pollutants.

Water and carbon dioxide or carbon anhydride are rarely harmful when compared with such components as hydrocarbons, carbon monoxide, and nitrogenoxides. For example, on a sunny day, without air, these latter components will react in such a way that they will produce a "photochemical smog" and cause damage to the eyes and throat as well as to plants.

Photochemical smog is more bothersome than it is damaging to one's health. Nevertheless, in reality some of its components are toxic and their pollution levels in the street, when compared with what a person can medically withstand, continue to increase and will creat major problems.

The maximum permissible concentrations are shown in FIG. 1, which is a comparative table of the amount of pollutants emitted by gasoline and diesel engines and which also shows that carbon monoxide is a substance that can cause more damage and which in high concentrations can be very harmful.

In addition, the effects of long-term exposure to low concentrations of these harmful gases are not known, although it is known that toxicity affects the health and reactions of drivers and operators and therefore the health of other persons travelling along the roads and highways.

In comparing inhalations of carbon monoxide with cigarette smoke, its effect can perhaps be equally as serious. Cigarette smoke, however, is a voluntary action that may be suspended when one chooses to do so. But this is not the case with exhaust gas from automobiles, which is imposed upon people in the surrounding environment and is difficult to avoid. For this reason, more attention must be devoted to its control and elimination.

Problems arising from CO and HC (hydrocarbons) are of a different type altogether, since they affect entire areas, whereas CO is a problem of local concentration, found only at intersections with a great deal of traffic. Nevertheless, in both cases the climate has a great influence and plays a major role, as, for example, in England, the air that flows through the city greatly aids in dispersing this type of gas by rapidly removing concentrations of same.

FIG. 1 shows that lead is not a problem. Nevertheless, perhaps long-term exposure to same may affect one's health. In this connection, it has been observed year after year that lead concentrations have increased in the water and in some foods; nevertheless, it seems that up to now its admission and expulsion are balanced in the human body, at least for the time being.

Gas emissions are caused, among other reasons, by an insufficient burning, by soft burning, or by poor carburetion, i.e., any factor that causes incomplete combustion. In effect, the fuel in the gasoline is not always completely burned and, therefore, the exhaust gases contain carbon monoxide (CO) unburned hydrogen, or hydrocarbons (HC) and nitrogen oxides ($NO_x$). On the other hand, when fuels are completely burned, the exhaust products are converted into water, carbon dioxide or carbon anhydride and small amounts of other products coming from the material of the additives.

Gasoline, in its character as the most common fuel used by vehicles, is a complex mixture of hydrocarbon compounds, which can contain more than 100 types of different compounds of same, ranging from a completely volatile element with only a few carbon atoms per molecule to very "heavy" compounds that can contain 20 or more carbon atoms per molecule.

It is important to note here the existence and use of additives in automotive vehicles. Gasoline, in fact, includes small quantities of additives, for example, lead compounds that have properties for preventing or reducing engine "knock". Other additives serve to control congestion in the carburetor.

Therefore, since hydrocarbons constitute one of the principal causes of photochemical smog, it is important to mention that when the breakdown point in the combustion stage is reached, the hydrocarbon content increases rapidly. The reason for the breakdown of the hydrocarbon content so that it drops to zero is because in an engine, part of the mixture does not have the chance to be burned, even in cases in which the richness of same is not the most desirable. In the first place, in an engine with a long valve-open period, a significant portion of the mixture passes directly to the exhaust without being trapped and further combusted in the cylinder. In the second place, all engines have, or receive a layer of a relatively cool mixture near the walls of the combustion chamber, which is not burned because the flow is smothered or flooded due to heat loss when it reaches said wall. This unburned cold layer of gas is only some thousandths of an inch thick, but is is very rich in hydrocarbons; therefore, during the exhaust period, several particles from this layer enter directly into the exhaust current by means of the depuration action originating in the chamber.

With respect to carbon monoxide, the concentration is reduced when the richness of the mixture varies from a rich condition to a lean condition. The carbon monoxide content in the exhaust gases is very small. For example, carbon monoxide concentrations (CO) in an engine at piston-deadcenter tend to be higher due to the difficulty found in burning a weak mixture under conditions of high dilution of exhaust. In addition, large emissions of gas may also be observed during acceleration periods.

It is important also to note that in practice a new complication arises, namely, high combustion temperature causing dissociation of the nitrogen in the air and the formation of nitrogen oxide and nitric oxide ($NO_x$). There is, therefore, no time for an inverse reaction during the rapid expansion of gases in the piston stroke resulting in some nitrogen oxide appearing in the exhaust, chiefly in the form of nitric oxide. The principal factor controlling the composition of the gases is the richness of the mixture. Also, it is important to take atmospheric pressure into account.

It must also be borne in mind that there exist elements that are derived from the additives, the most important of which is lead. The anti-knock additives, namely lead, contain lead tetraethyl (TEL) or lead tetramethyl (TML), with bromide used as an adjustor. Usually, approximately one-fourth of the lead remains in the lubricating oil of the motor and in the exhaust system, while the rest is deposited rapidly by the action of the air. Nevertheless, approximately 10% leaves via the exhaust in the form of particles less than one microgram in diameter.

Nor should it be forgotten that the counter-compressions of an engine cause damage, but it is not desirable for the engine to eliminate every counter-compression.

Straight mufflers have been designed to preserve a small amount of the counter-compression, although not as much as those having dampeners, especially in the development of high r.p.m. engines. The polluting gases described heretofor are formed during combustion of gasoline or diesel fuel.

In considering the most appropriate means for controlling the gases discharged via the exhaust system, it is preferable to take a more curative than preventive approach.

The basic means is to add extra air (secondary) to the exhaust current. In addition, a catalytic converter is used to stimulate a more rapid burning of the undesirable components of the exhaust gas.

The catalytic converter which will be made with the new composition, which is the subject of this invention, will replace the conventional muffler. In the muffler of this invention the gas will pass through the catalytic component which will reduce the level of carbon monoxide (CO) to the concentration level specified in the most recent acceptable standards. The muffler will have no effect on the efficiency of the vehicle.

Most of the carbon monoxide and nitrogen oxide are released only via the exhaust pipe. However, with hydrocarbons, 60% will exhaust through the exhaust pipe, but another 20% will escape from the crankcase. The remaining 20% is lost through evaporation.

The design of automobile exhaust systems has developed into a highly complex technology. The converter, which is the subject of the invention, will greatly improve the art but still within the strict framework of limitations on space, weight, durability and cost.

Having attempted to illustrate the causes responsible for photochemical smog and the elements that constitute it, it is of particular importance to emphasize that the converter, which is the subject of this invention, has been built and successfully tested.

These and other objects of the invention will become more apparent to those skilled in the art by reference to the following detailed description when viewed in light of the accompanying drawings wherein:

DETAILED DESCRIPTION OF THE DRAWINGS

Figure 1:
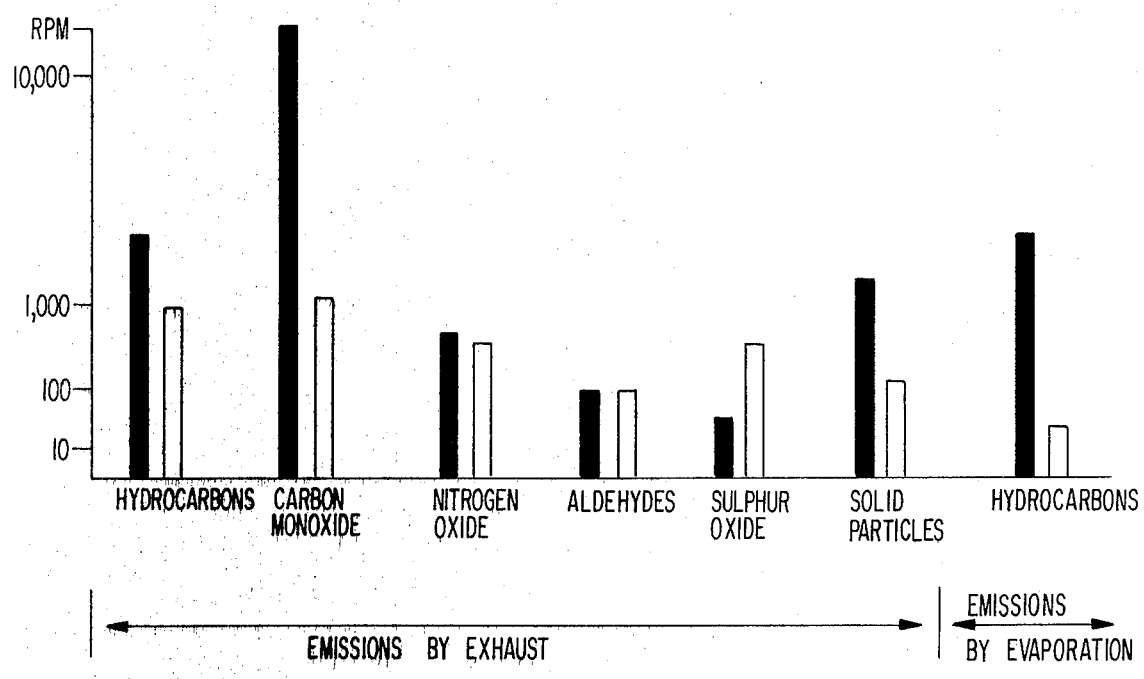
FIG. 1 is a chart showing levels of emission of pollutants in exhaust gases.

Reference has already been made to FIG. 1 which shows the relative levels of pollutants in exhaust gases.

The pollutant converting composition which is the major element of this invention consists of the following formula and in the following percentages:

| Alloy: | 1. | 1.0% to 1.9% of (Si) Silicon, but for greater effectiveness, 1.6% of (Si) is advisable. |
| --- | --- | --- |
| | 2. | 10.% to 29% of (Cr) Chrome but for greater effectiveness, 19.% of (Cr) is advisable. |
| | 3. | 1.0% to 5.1% of (Cu) Copper but for for greater effectiveness, 1.6% of (Cu) Copper is advisable. |
| | 4. | 1.1% to 9.1% of (Mo) Molybdenum, but for greater effectiveness, 3.1% of (Mo) is advisable. |
| | 5. | 0.11% to 0.5% (Ti) Titanium, but for greater effectiveness, 0.2% of (Ti) is advisable. |
| | 6. | 0.1% to 1.9% of (C) Carbon, but for greater effectiveness, 0.8% (C) is advisable. |
| | 7. | 0.5% to 0.9% of (Fe) iron but for greater effectiveness 0.7% of (Fe) is advisable. |
| | A. | With an elongation increase of 23% to 45% |
| | B. | Using thicknesses of 1.37 mm Using thickness of 1.21 mm |
| | C. | Quenching No. 6 = Soft |
| | D. | Quenching No. 1 = Hard |

3.1% Molybdenum is used to increase resistance to hot chemical products with a small quantity of (Se) Selenium to improve machining. Alloys with high content of (Cr) Chrome are used for strong chemical resistance to high temperatures. A new rust-resistant steel is obtained with a long service life of high temperatures.

(Si) Atom - Atomic Number 28 - Atomic Mass 28.09
(Cr) Atom - Atomic Number 28 - Atomic Mass 52.01
(Cu) Atom - Atomic Number 29 - Atomic Mass 63.54
(Mo) Atom - Atomic Number 42 - Atomic Mass 95.95
(Ti) Atom - Atomic Number 22 - Atomic Mass 47.9
(C) Atom - Atomic Number 6 - Atomic Mass 12.010
(Fe) Atom - Atomic Number 26 - Atomic Mass 55.85

Figure 2:
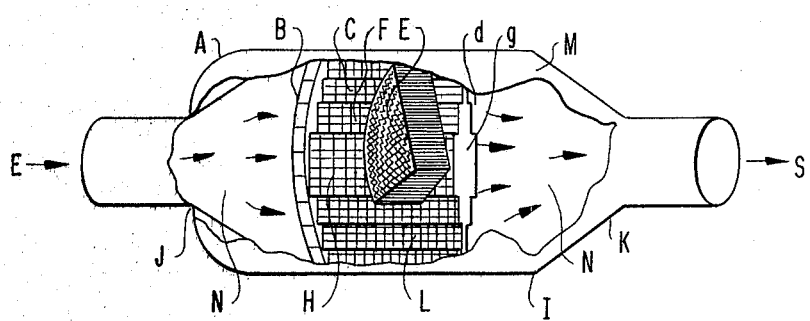
FIG. 2 is a perspective view of the converter of this invention, partially cut away.

In FIG. 2, A is a low cost, rust-resistant steel covering for use in high temperatures.

B is a silver (Ag) or palladium (Pd) plated grill that permits within its interior expansion inside the contiguous chamber and allows absorption of the energy of the sound pressure waves in exhaust gases, creating an artificial turbulence in the flow.

Friction and interference among the gas molecules converts the pressure energy into heat. The grill is the place where the exhaust gases can be swirled and can complete the combustion of hydrocarbon and carbon monoxide.

C is a mesh made of rust-resistant steel and of wire that form an echelon-shaped filter along the edges and that is designed to prevent a counter-compression to the flow of gases. This mesh screen is coated with silver (Ag) or palladium (Pd). This filter is supported by the walls of the grill and the covering.

The structure that forms the catalyst filter is a compound that starts a chemical reaction among the compounds, without actually participating in the reaction. It is called the catalyst for the structure for the simple reason that it is coated with palladium (Pd) and silver (Ag).

D is a metal sheet coated with chrome and that has the same structure as the mesh filter. This filter may be replaced when it begins to wear out. The above-mentioned filter is designed to economize maintenance of the catalytic filter since its average life range, measured in kilometers, ranges from 30,000 to 60,000.

The chrome coating is used to improve operation of the catalyst agent at high temperatures with chemical compounds.

E indicates several small triangles located inside the filter structure. These small triangles are made of thin strips coated with palladium (Pd) or of silver (Ag), its core consisting of iridium (Ir) and have an approximate surface size of 4 mm and are mounted one above another.

Dangerous substances such as (HC), (CO), are transformed into water and carbon dioxide, when the two polluting substances enter into contact with the catalytic agents of iridium and silver or palladium.

Exhaust gases consisting of HC, CO, and $NO_x$ exit through the inner surface of the filter passing via the surface of the small triangles, thus allowing the chemical reaction to reduce the damaging compounds (HC, CO, and $NO_x$). It concerns a simple chemical reaction — an oxidation reaction, assuming the original elements are combined with oxygen atoms in the presence of the catalyst.

Carbon monoxide, hydrocarbon and nitrogen oxide emissions achieve intimate contact with the catalytic elements within the converter without creating excessive back-pressure which can seriously damage the operation of the engine or fuel economy.

F indicates several thin plates made of rust-resistant steel, type 316, and their function is to strengthen the outer and inner structure of the catalytic filter.

G is the core of the catalyst filter which is coated with iridium (Ir).

H is a central communication converter trap, which is the name by which this catalyst agent is known.

I indicates gas seals that are used for the purpose of sealing the final connecting device of the casing unit or final part of the converter.

J is the outer shape which may have an oval, round, or square or any other shape that may be suitable.

K is the final shape of the converter, its outer surface having a finish in the form of a bullet.

L illustrates the "echeloned" finish of the catalytic filter in question.

M is a floating anti-insulation covering separated by 1/20 inch from the converter cover, whose separation is designed to allow a flow of air between the converter and the insulator to produce a coolant in the form of an air current that is obtained by the speed of the automobile itself.

N illustrates several chambers in vacuum that permit the separation between the catalyst itself. These chambers are designed to reduce the trajectory of the initial sound wave.

It is also important to note that the catalytic converter, which is the subject of this invention has been designed for use in automobiles with four, six, and eight cylinders.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. A catalytic converter for transforming polluting gases into non-polluting gases comprising:
   (a) a housing having an inlet for the polluting gases and an outlet for the non-polluting gases;
   (b) a silver coated grill within said housing adjacent to the housing inlet;
   (c) a mesh, intermediate said silver coated grill and the housing outlet, said mesh comprising an alloy base consisting essentially of:
   from 1.0% to 1.9% silicon,
   from 10% to 29% chrome,
   from 1% to 5.1% copper,
   from 1.1% to 9.1% molybdenum,
   from 0.11% to 0.5% titanium,
   from 0.1% to 1.9% carbon and from 0.5% to 0.9% iron and a coating of silver or palladium on said alloy.

2. The catalytic converter of claim 1 further characterized in that said alloy consists essentially of:
   1.6% silicon,
   1.9% chromium,
   1.6% copper,
   3.1% molybdenum,
   0.2% titanium,
   0.8% carbon, and
   0.7 iron.

3. The catalytic converter of claim 1 further characterized in that the coating on the base alloy is palladium and silver.

4. The catalytic converter of claim 3 further characterized in that the catalytic converter has a chrome plated mesh intermediate the palladium and silver coated mesh and the outlet.

5 The catalytic converter of claim 1 further characterized in that a plurality of triangular elements having a surface area of about 4mm comprised of an iridium core with a palladium or silver coating are disposed within mesh (c).

* * * * *